US008830112B1

(12) United States Patent
Buehler et al.

(10) Patent No.: US 8,830,112 B1
(45) Date of Patent: Sep. 9, 2014

(54) AIRBORNE RADAR JAMMING SYSTEM

(75) Inventors: Walter E. Buehler, Issaquah, WA (US);
Roger M. Whitson, Auburn, WA (US);
Michael J. Lewis, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 06/225,699

(22) Filed: Jan. 16, 1981

(51) Int. Cl.
*G01S 7/38* (2006.01)
*G01S 7/36* (2006.01)
*H04K 3/00* (2006.01)

(52) U.S. Cl.
CPC ... *G01S 7/38* (2013.01); *G01S 7/36* (2013.01); *H04K 3/46* (2013.01)
USPC .............................................. 342/13; 342/14

(58) Field of Classification Search
CPC ........... G01S 7/38; G01S 7/36; G01S 7/2813; G01S 7/021; H04K 3/45; H04K 3/224; H04K 3/46
USPC ............ 343/18 E, 707; 244/3.12; 342/13–19, 342/95–97, 9
See application file for complete search history.

(56) References Cited

U.S. PATENT DOCUMENTS

| 3,086,202 A * | 4/1963 | Hopper et al. ........... 343/18 E X |
| 3,496,567 A * | 2/1970 | Held .............................. 343/707 |
| 3,792,475 A * | 2/1974 | Smetana .................. 343/18 E X |
| 3,829,861 A * | 8/1974 | Karaganis et al. ............ 343/707 |
| 4,050,070 A * | 9/1977 | Beno et al. ................ 343/18 E X |
| 4,121,214 A * | 10/1978 | Marinaccio et al. ........ 343/18 E |
| 4,149,166 A * | 4/1979 | Null ............................. 343/18 E |
| 4,278,955 A * | 7/1981 | Lunden ........................... 333/33 |
| 4,307,400 A * | 12/1981 | Miley .......................... 343/18 E |
| 4,342,119 A * | 7/1982 | Seidl ........................ 343/18 E X |
| 4,354,419 A * | 10/1982 | Patterson ...................... 89/1.11 |
| 7,154,430 B1 * | 12/2006 | Buehler et al. .................. 342/13 |

* cited by examiner

*Primary Examiner* — John B Sotomayor
(74) *Attorney, Agent, or Firm* — The Boeing Company

(57) ABSTRACT

A radar jamming signal generated by equipment carried by a target aircraft, is launched onto the leading end of a towed single wire transmission line so as to travel the length of the line as a nonradiating surface wave. A drogue radiator is attached to the trailing end of the line for radiating the jamming signal transversely of the towed line so as to be received by and cause jamming of tracking and/or fire control radar. The length of the single wire transmission line is selected so that the trailing radiator causes the jamming signal to emanate from a position sufficiently behind the aircraft so as to be outside the destructive radius of weapon fire directed at the apparent source of the jamming signal by fire control radar. A ventriloqual-like deception of the radar is thus achieved. A wave launcher couples the jamming signal to the leading end of the transmission line and for this purpose includes an electrically conducted horn-shaped structure, a tunable coaxial feed end at the constricted end of the horn structure, an inner transition conductor connecting the inner conductor of the coaxial feed to a leading end of the single wire transmission line, and a plurality of annular dielectric lenses and dielectric guides cooperatively shaped and fitted to the horn structure in a manner that effectively matches the bounded electromagnetic transmission wave characteristics of the coaxial feed cable with the surface wave transmission characteristics of the single wire transmission line. Coacting with the ventriloqual-like radiation of the jamming signal from the trailing end of the transmission line is an anti-integration network that hides the return radar signal reflected off the target aircraft in a signal energy "hole" created for such purpose in a secondary low level noise signal transmitted directly from the aircraft.

5 Claims, 6 Drawing Sheets

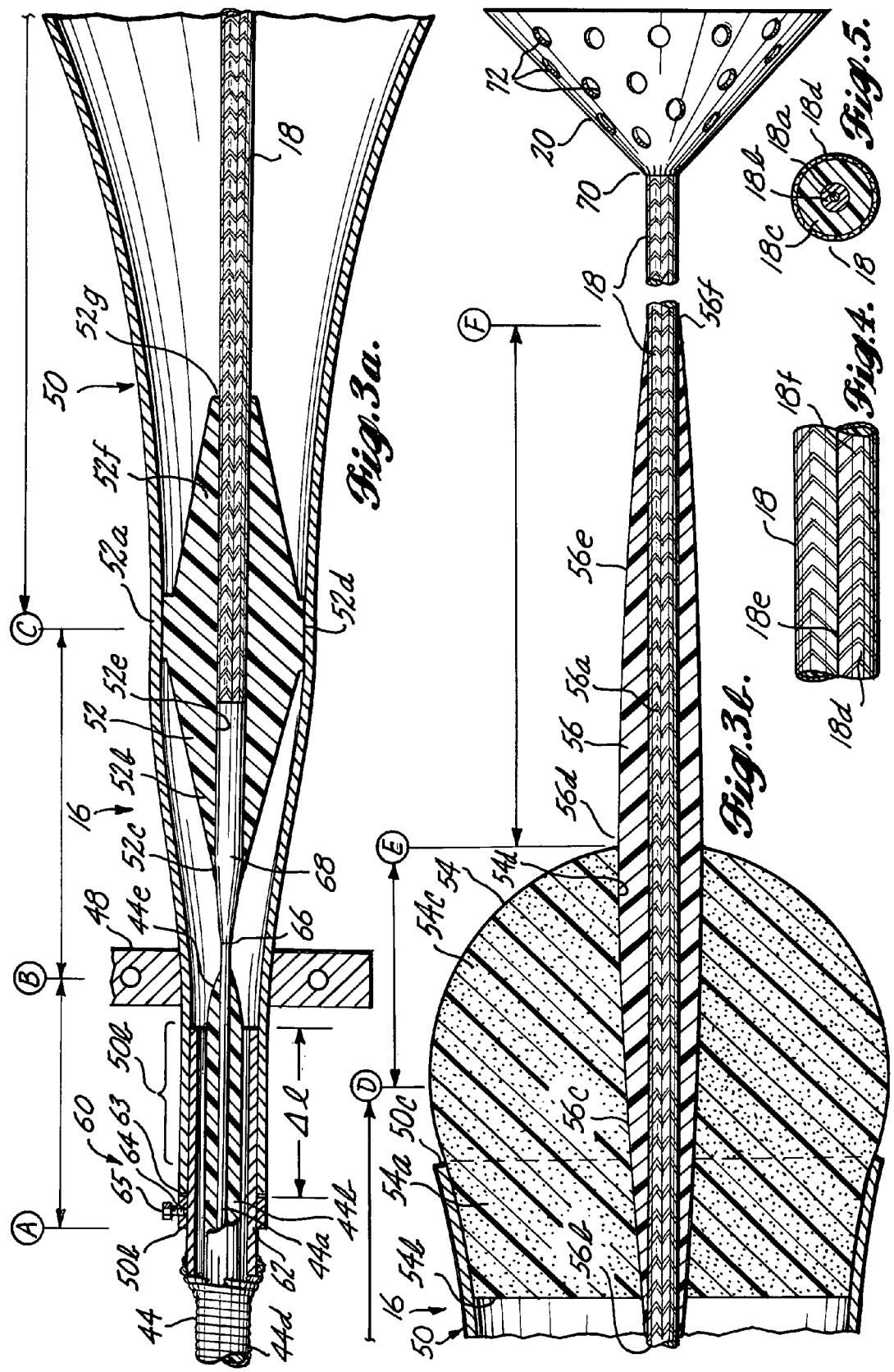

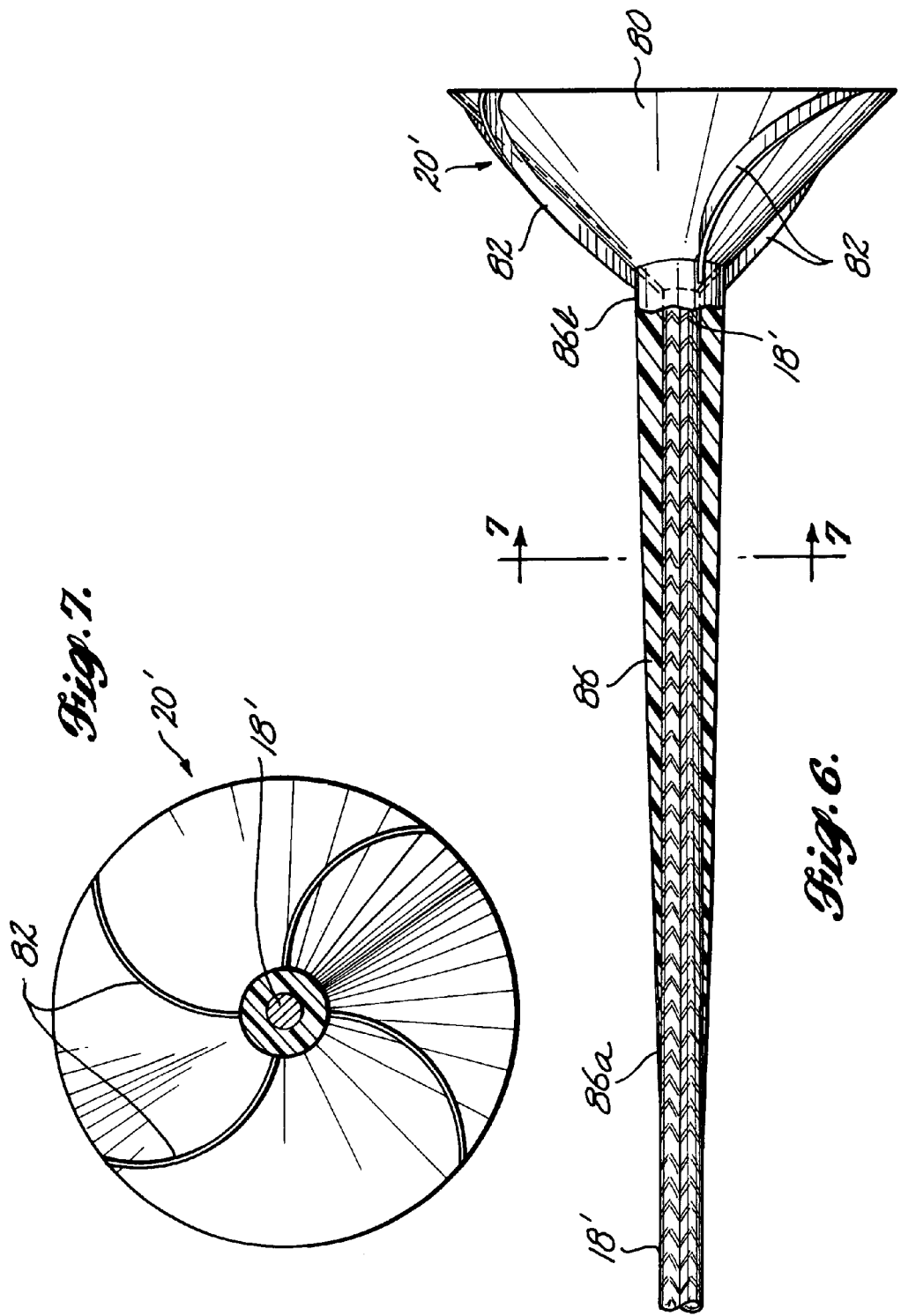

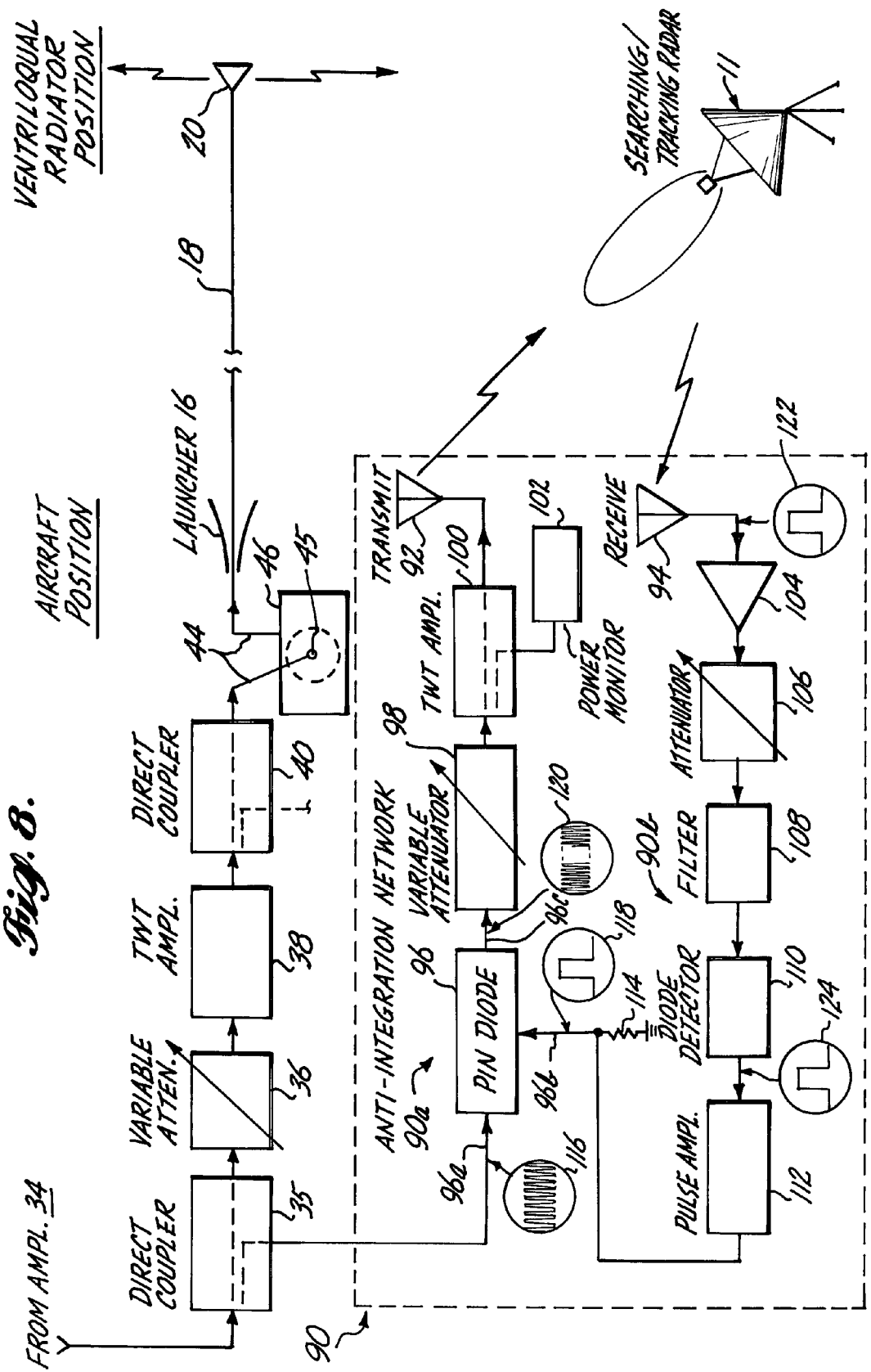

AIRBORNE RADAR JAMMING SYSTEM

BACKGROUND OF THE INVENTION

The invention pertains to signal jamming systems, carried by manned or unmanned aircraft including missiles, for the avoidance of position locating, tracking and fire control radar.

The subject matter of the present application is related to a co-pending application, Ser. No. 225,698, filed Jan. 16, 1981 by Walter E. Buehler, David C. Lunden and Michael J. Lewis (BASC-1-0634), entitled Apparatus and Method for Ventriloqual-Like Jamming of Radar Including an Aircraft Towed Single Wire Transmission Line and Wave Launcher Therefor.

The use of radar signal jamming equipment carried onboard manned and unmanned aircraft to mask the aircraft's position from position locating, tracking and fire (weaponry) control radar is one of a number of known radar avoidance techniques that fall in the broader field of electronic counter measures (ECMs). Existing jamming techniques are primarily effective in denying the radar equipment range information, i.e., the distance between the radar and the target aircraft. However, the transmission of the jamming signal, emanating as it does from the aircraft, enables some radar systems to home-in on the source of the jamming signal, which is typically a noise signal in the frequency band of the radar, and thereby acquire accurate information representing the angular position of the aircraft. This angle information alone, even without range determination, is sufficient to allow for many types of weaponry, aimed by fire control radar, to reach and destroy the target aircraft. Thus, the mere generation and transmission of a noise jamming signal is not totally effective and providing the desired masking of the aircraft to the tracking radar.

The above-identified related application Ser. No. 225,698, discloses and claims a ventriloqual-like jamming method and apparatus by which the jamming signal deceptively emanates from a position which is removed at a safe distance behind the target aircraft. The present invention concerns an improvement to that method and apparatus.

In particular, it is an object of this invention to provide a ventriloqual-like jamming system of the type characterized in the related application Ser. No. 225,698, that has the capability of hiding the excess signal energy associated with a return radar signal reflected off the target aircraft, and which energy might otherwise provide a trackable signal source revealing the position of the target aircraft.

SUMMARY OF THE INVENTION

These and other objects, features and advantages are achieved in accordance with the invention by an airborne radar jamming method and apparatus characterized by the provision of an anti signal-integration method and apparatus in combination with the basic ventriloqual jamming system disclosed and claimed in the above-identified co-pending application Ser. No. 225,698. In that application and as disclosed herein, a single wire transmission line is towed behind a target aircraft, which as the term is used herein includes manned or unmanned aircraft, missiles, rockets, and the like, for causing a jamming signal to be radiated at a "safe" distance behind the aircraft. Briefly, the principal elements of the jamming system include an onboard signal generator for producing a broadband noise (jamming) signal, the above-mentioned single wire transmission line towed by the aircraft, a broadband electromagnetic wave launcher for launching the noise signal produced by the signal generator onto a leading end of the single wire transmission line such that the electromagnetic noise energy is transmitted as a surface wave along the line to a trailing end thereof. A drogue radiator is attached to the trailing end of the single wire transmission line for both aerodynamically stabilizing the line and for radiating the noise signal away from the axis of the line and toward the tracking radar. The anti signal-integration co-functions with the radar signal masking effect of the ventriloqual-like jamming signal, for hiding the excess signal energy of the radar return signal that is reflected off the skin of the target aircraft. For this purpose, an onboard anti-integration network responds to the receipt of a transmitted radar signal at the aircraft, and responsively generates and transmits a noise signal having an energy gap therein, such gap being positioned in real time to form a "hole" into which the return radar signal energy pulse is tucked (hidden). By so doing, tracking radar using signal integration techniques cannot resolve the radar return signal which would otherwise be superposed as a signal energy "bump" on a constant level background of the jamming noise signal.

To provide a complete disclosure of the invention, reference is made to the appended drawings and following description of one particular and preferred embodiment.

BRIEF DESCRIPTION OF THE DRAWINGS

FIGS. 3a and 3b together show a detailed, axial sectional view of the axisymmetric wave launcher, single wire transmission line and drogue radiator.

FIG. 4 is an enlarged, detailed, elevational view of a lengthwise segment of the single wire transmission line.

FIG. 5 is a detailed, cross section view of the single wire transmission line of FIG. 4.

FIG. 6 is a view, partly an axially section, similar to FIG. 3b, showing an alternative configuration of the drogue radiator, and an associated delaunching dielectric lens for causing the electromagnetic energy of the radar jamming signal to be efficiently coupled to and thence radiated by the drogue.

FIG. 7 is an axial, end view of the drogue radiator of FIG. 6, looking aft along the single wire transmission line toward the apex of the conical shaped drogue.

FIG. 8 is a detailed, block diagram of the noise signal jamming system in which an anti-integration network co-functions in combination with the ventriloqual-like radiation of the jamming signal in order to further mask the radar return signal reflected by the skin of the aircraft.

DETAILED DESCRIPTION

Figure 1:
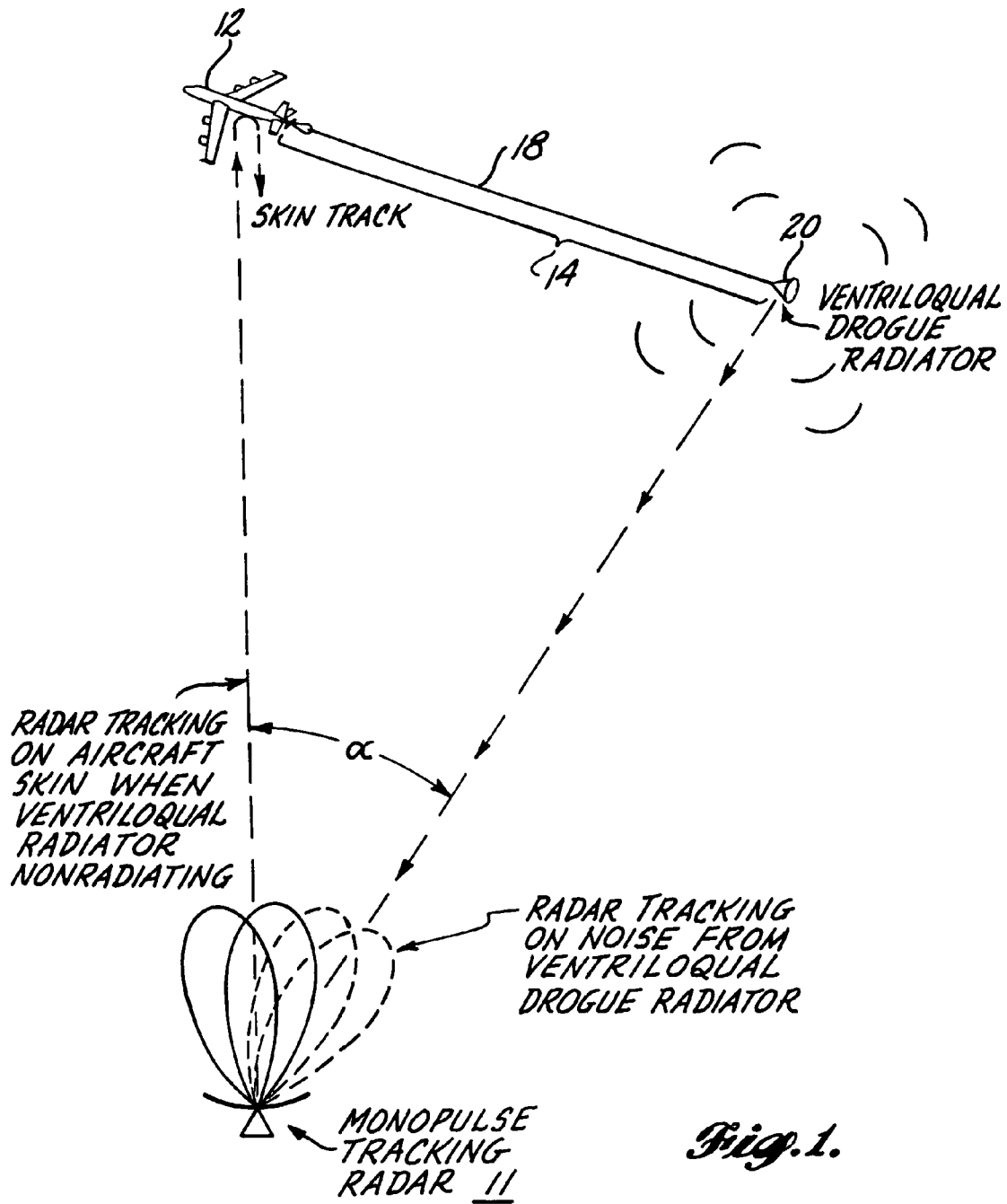
FIG. 1 is a generalized view of the ventrilogual-like radar jamming system illustrating a target aircraft towing the electromagnetic wave launcher, single wire transmission line and drogue radiator for radiating a radar jamming signal from a deceptive distance behind the aircraft position.

FIG. 1 illustrates how the ventriloqual-like jamming system radiates a radar jamming noise signal in a manner that denies radar 11, angle information of the position of a target aircraft 12, even though the signal receiving components of radar 11 are capable of homing on and tracking a noise source when the skin-reflected radar return signal is masked by radiating a jamming signal. Attached to aircraft 12 so as to be towed thereby is a single wire transmission line subsystem 14 including a wave launcher 16, a single wire transmission line 18 extending from a leading end which is mechanically and electrically coupled to the towing aircraft 12 by wave launcher 16. Line 18 terminates at a substantial distance behind aircraft 12, and a drogue radiator 20 is attached to the trailing end of the line.

As described in greater detail in the section herein dealing with the system's operation, radar 11 may in the absence of an effective jamming signal function to locate and track the actual position of the aircraft by receiving and processing the radar return signal reflected by the target aircraft. The position of the aircraft is located by its angular coordinates and range (distance) with respect to the location of radar 11. If in an attempt to defeat skin tracking by radar 11, a noise jamming signal is radiated by and from target aircraft 12, many radar tracking systems such as radar 11, have alternative receiving modes which enable them to home on and track a noise signal source even though the return signal from the aircraft skin is masked by the jamming signal. Hence, radar 11 functioning in such a noise tracking mode will continue to provide the angle information of the position of aircraft 12, even though the range information is denied because of the masking effect of the jamming signal.

With the addition of the single wire transmission line subsystem 14, a ventriloqual-like radiation of the noise signal is achieved so that the tracking radar 11 is denied both range and angle information. The noise signal generated onboard aircraft 12 is coupled by launcher 16 to the leading end of the single wire transmission line 18 which is characterized by low loss and low leakage transmission. The noise signal energy travels, as a surface wave, the length of line 18 to the trailing end thereof where the energy is intercepted by drogue radiator 20 and radiated thereby transversely outwardly from that location, such that a portion of the radiation is propagated toward the tracking radar 11. The length of transmission line 18 is selected so that the angle error between the actual position of aircraft 12 and the apparent position (because of the noise source) at drogue 12 is, for a typical range from radar 11, greater than the destruction radius of any anticipated anti-aircraft weaponry. Thus, the angle α that is subtended at the tracking radar 11 by the length of the single wire transmission line 18 should be large enough given the distance (range) of aircraft 12 from radar 11 to dispose drogue radiator 20 far enough behind aircraft 12 so that artillery, armed missiles or rockets, when exploded in the vicinity of the drogue radiator will not inflict disabling damage on aircraft 12.

Figure 9:
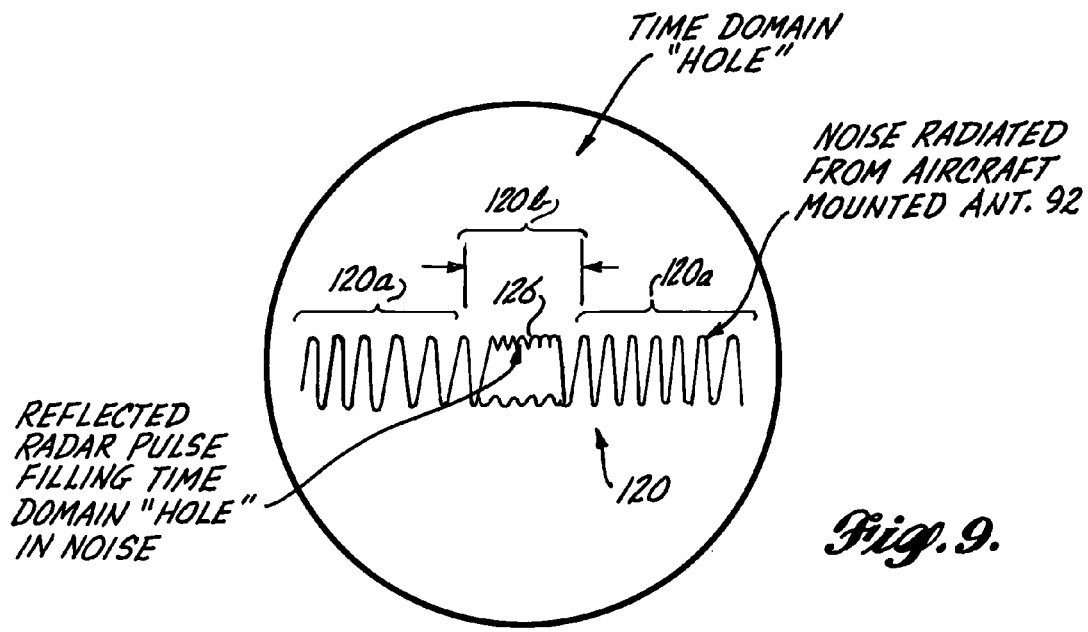
FIGS. 9 and 10 are waveform diagrams depicting the improved masking effect achieved by the anti-integration of FIG. 8 in combination with the ventriloqual-like radar jamming system shown in FIG. 2.
Figure 10:
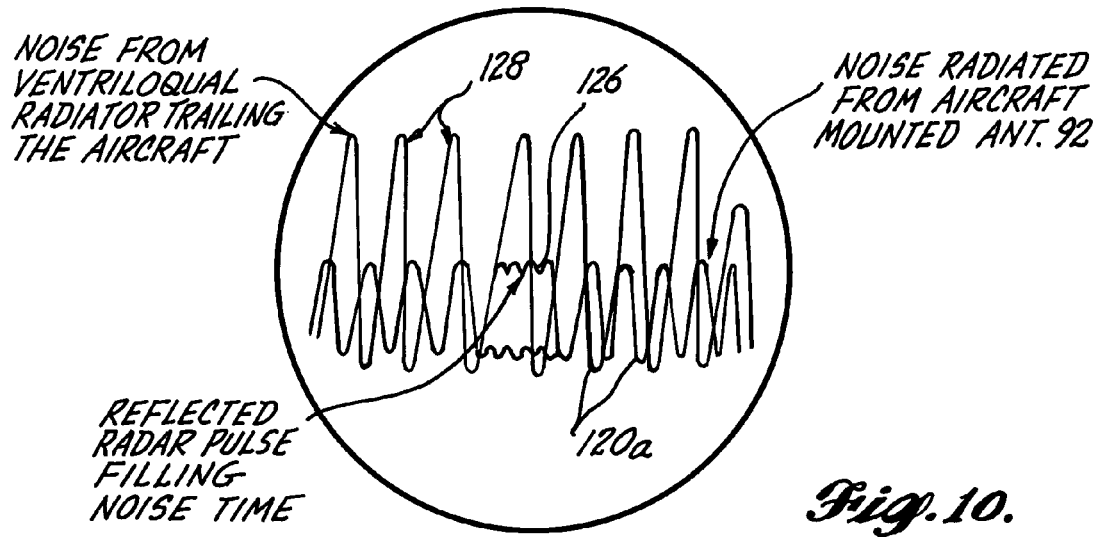

Cooperating with the ventriloqual-like jamming signal emitted by drogue radiator 20 of FIG. 1, is an anti-integration network 90 (FIG. 8) carried onboard aircraft 12 along with the noise signal generating and power amplification subsystems that apply the noise signal to single wire transmission line 18. Anti-integration network 90, which will be more fully described herein in connection with FIGS. 8, 9 and 10, provides further masking of the radar return signal reflected off the skin of aircraft 12 by radiating a relatively low level background noise signal directly from aircraft 12 and creating time domain voids (holes) in the thusly generated background noise, each void being positioned in time to coincide with the skin reflected radar return signal. Thus, the signal energy associated with the radar return signals is hidden in such time domain "holes" created in an otherwise continuous background noise signal transmitted directly from aircraft 12 to defeat signal integrating techniques employed in conjunction with tracking radar 11 from improving on the range and angle information of the position of aircraft 12 by resolving the skin return signal energy that would otherwise exist as "bumps" of signal energy superimposed on the ventriloqual jamming noise emitted by drogue radiator 20.

Figure 2:
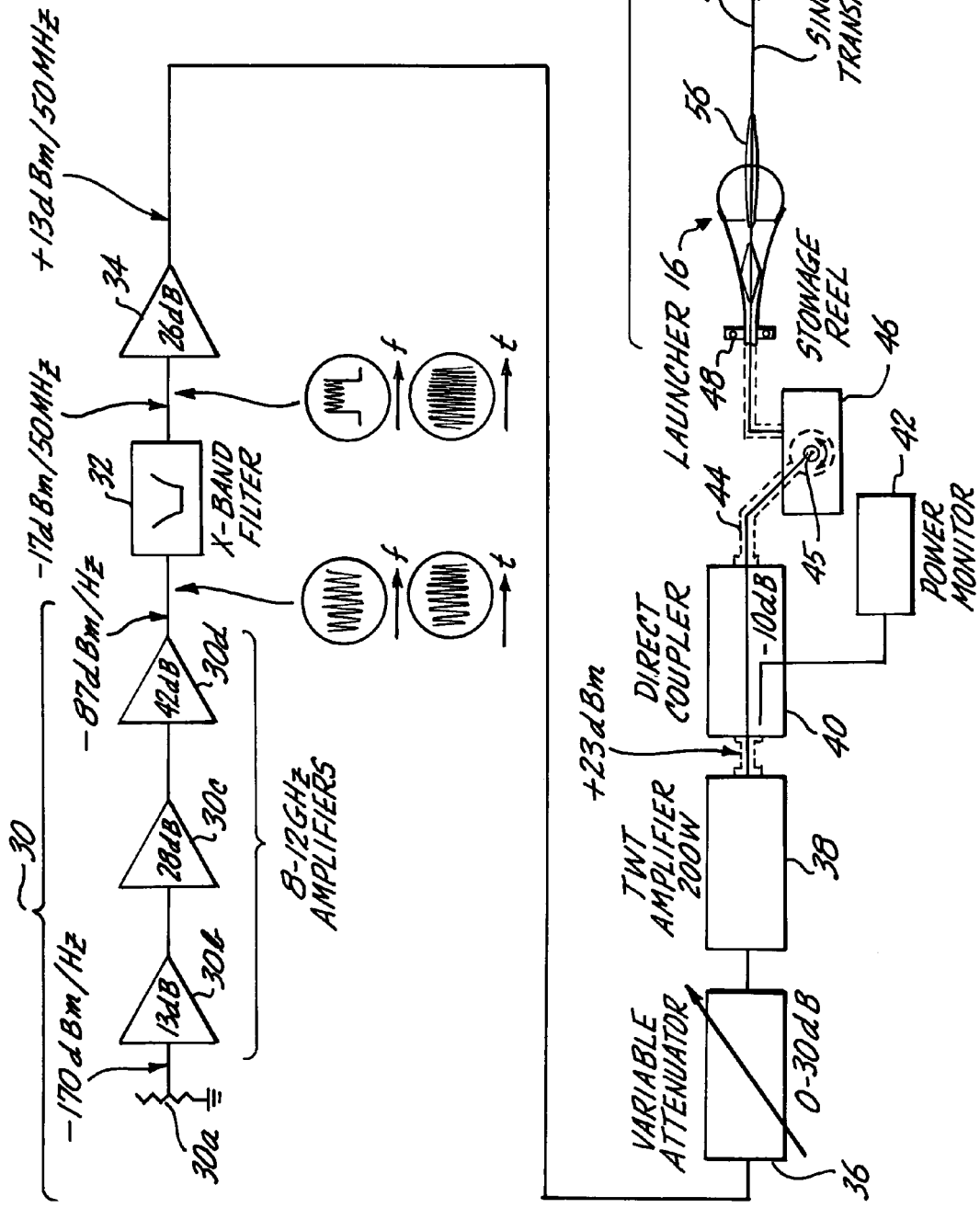
FIG. 2 is a detailed, block diagram of the noise signal jamming system including the noise generator and power amplifier in combination with a line stowage reel, an electromagnetic wave launcher and the towed single wire transmission line with the drogue radiator.

Now with reference to FIG. 2, the single wire transmission line subsystem 14 is driven by an onboard noise signal generator and power amplifier that includes a wideband noise signal source 30 and suitable filtering, preamplification, variable gain control and power amplification provided here respectively by an X-band filter 32, an amplifier 34, variable attenuator 36 and a traveling wave tube (TWT) amplifier 38. Generator 30 provides a source of essentially white noise by tapping the thermal noise existing in a resistor 30a and then successively amplifying the thermal noise in a plurality of cascaded, microwave amplifiers 30b, 30c and 30d. In this embodiment, these cascaded amplifiers have a one octave wide bandwidth of 6 to 12 gigahertz so as to receive the low level noise signal from resistor 30a (at −170 dbm/Hz) and successively raise the signal level by 13 db, 28 db and 42 db to a level of −87 dbm/Hz at the output of generator 30.

The thusly generated noise signal is now applied to an X-bandpass filter 32 that slices from the broadband noise signal, a noise spectrum of several tens of megahertz centered about the mid-frequency of the bandpass of microwave amplifiers 30b, 30c and 30d. The slice of noise signal energy from filter 32 is now further amplified by amplifier 34 having a 26 db gain to bring the signal strength up to a level suitable for power amplification by the traveling wave tube amplifier 38. Variable attenuator 36 serves to adjust the gain of the signal to a desired level prior to power amplification. The output of TWT amplifier 38 brings the signal level up to +23 dbm from the +13 dbm per 50 megahertz at the output of amplifier 34. The noise signal has now been power amplified to about 200 watts, sufficient to cause approximately 10-20 watts to be radiated by drogue radiator 20 of subsystem 14. To monitor the power level of the transmit signal, as it exists at the output of power amplifier 38, a direct microwave coupler 40 is inserted in series between amplifier 38 and the transmission line subsystem 14, and a power monitor 42 is connected via coupler 40 to provide a measured indication of the transmitter output wattage.

From direct coupler 40, the transmit signal energy is fed through a coaxial cable 44 to subsystem 14. A junction exists between coaxial cable 44 and the single wire transmission line 18 in a manner described more fully below in connection with FIGS. 3a and 3b. Between coupler 40 and launcher 16 of subsystem 14, as schematically shown, a stowage reel 46 is provided including such means as a rotary coaxial joint 45 mounted at the hub of reel 46 for connecting a nonrotating section of cable 44 from coupler 40 to another section of the feed cable 44 which along with line 18 is adapted to be wound onto rotatable reel 46. A means is thereby provided for stowing single wire transmission line 18 and a feed section of coaxial cable 44 when line 18 is retracted from the extended position as it is shown in FIGS. 1 and 2 by drawing the line forwardly through a sliding coupling with launcher 16 until drogue 20 is pulled up against launcher 16. Although not shown in the drawings, stowage reel 46 is mounted onboard aircraft 12 at a location adjacent an opening in the aircraft body in registration with launcher 16 which is mounted on the exterior of the aircraft. Reel 46 is thus positioned for selectively dereeling line 18 to deploy the single wire transmission line subsystem 14 and to retract the line so as to draw drogue radiator 20 up against launcher 16.

As shown in greater detail in FIG. 3a, the center conductor of coaxial feed cable 44 is joined by a tapered transition conductor to a leading end of the single wire transmission line 18 and the outer conductor of cable 44 is adapted to be removably connected to the constricted end of launcher 16 when line 18 is fully deployed. Thus, when line 18 is to be retracted, storage reel 46 is adapted to first wind in a short section of coaxial feed cable 44 that is disposed between reel 46 and the constricted end of launcher 16 and thereafter to continue winding in the single wire transmission line 18 until as mentioned above drogue radiator 20 is pulled up against the launcher. In this embodiment, launcher 16 is mounted to the exterior of aircraft 12 by suitable means such as enabled by the mounting bracket 48 illustrated in FIGS. 2 and 3a of the drawings.

As described in greater detail herein in connection with FIGS. 3a, 3b, 4 and 5, launcher 16 when line 18 and drogue 20 are fully deployed, launches the generated and amplified noise signal energy onto a conductive outer surface of line 18 as a traveling surface wave, with only negligible loss in the form of radiation radially of launcher 16 and line 18. When the launched surface wave, however, encounters the divergent conical surface of drogue radiator 20 at the trailing end of line 18, the noise energy is deflected generally radially of the drogue's axis so that part of the radiation propagates toward radar 11.

The above-mentioned anti-integration network 90 is combined in accordance with the present invention, as shown in FIG. 8, with the basic ventriloqual-like jamming system shown separately in FIG. 2. With reference to FIG. 8, a direct coupler 35 is serially incorporated in the signal path of the noise generating and amplifying circuitry between amplifier 34 and variable attenuator 36 (compare FIGS. 2 and 8) so as to tap some of the signal energy having the same broadband characteristics as the ventriloqual noise signal for feeding the tapped signal to anti-integration network 90. In general, network 90 includes a transmitting channel 90a and a receiving channel 90b which are respectively equipped with transmit and receive omni-directional antennas 92 and 94 mounted on the target aircraft 12 so as to be in signal communication with the tracking radar 11.

More particularly, the transmitting channel 90a of network 90 includes a pin diode 96, a variable attenuator 98, an additional traveling wave tube (TWT) amplifier 100 and a power monitor 102 coupled with amplifier 100 so as to monitor the input power level thereto. Transmit antenna 92 is coupled to the output of amplifier 100.

The receiving channel 90b of network 90 includes an amplifier 104 having an input coupled to the receive antenna 94 for developing a timing signal representing the reception at aircraft 12 of a radar tracking transmit pulse signal emitted by radar 11. Serially connected to the output of amplifier 104 are a variable attenuator 106, a filter 108 broadly tuned to the anticipated frequency range of the radar transmission, a diode detector 110 and a pulse amplifier 112, the output of which is terminated by a resistor 114 connected to ground.

As the primary noise signal is fed to launcher 16 and hence transmitted along line 18 to drogue radiator 20 which is disposed at a substantial distance behind target aircraft 12, a portion of the noise signal energy is tapped by direct coupler 35 and fed as continuous noise signal, indicated by waveform 116, to an input 96a of pin diode 96, which also has a control input 96b. Diode 96 functions, at the frequencies of the bandwidth of the input noise signal, as a switch, controlled by a pulse output from the receiving channel 90b, shown by waveform 118, and applied to control input 96b of pin diode 96. The pulse waveform 118 serves as a gate signal that blocks transmission of the noise signal 116 through pin diode 96 at the time of, and for the time duration of the control pulse applied to input 96b. The resulting output waveform 120 from an output 96c of diode 96 thus appears as a substantially continuous noise signal having a gap or time domain "hole" that coincides with the width and time position of the pulse of waveform 118.

The noise signal with the time domain "hole" is fed through variable attenuator 98 and then power amplified by traveling wave tube amplifier 100. Transmit antenna 92 may be provided by an omni-directional stub on the top of the aircraft fuselage, and coupled to amplifier 100 so as to be driven at a transmit power level that is substantially less than the power delivered over single wire transmission line 18 to drogue radiator 20.

Receiving channel 90b responds to the pulse signal emitted by tracking radar 11 and times the gating pulse shown by waveform 118 so as to create a time domain "hole," shown in waveform 120, that coincides with the timing of each return radar signal reflected off the skin of target aircraft 12. For this purpose, the pulse signal is received by antenna 94, which for example may be provided by an omni-directional antenna similar to the transmit antenna 92, but mounted on the belly of the target aircraft 12, for developing a receive signal indicated by waveform 122 that represents the timing and time width of the radar pulse signal as it arrives at the target aircraft 12. The thusly received signal is amplified, adjustably attenuated and filtered by amplifier 104, attenuator 106 and filter 108 respectively, and then the envelope of the signal is detected by diode detector 110 resulting in the waveform depicted at 124 which in turn is connected to drive pulse amplifier 112 to produce the control signal shown by waveform 118 and described above in connection with the operation of pin diode 96.

Thus, as described in greater detail hereinafter in connection with FIGS. 9 and 10, the receive channel 90b responds to the radar transmit signal as it arrives at the target aircraft 12 and places a gap or time domain "hole" in the otherwise continuous noise signal that is fed through the transmitting channel 90a. The resulting transmission from antenna 92 is a signal having a time domain configuration which as shown by waveform 120 has the "holes" positioned so as to be filled by the return radar pulse signals that are reflected off the aircraft's skin.

With reference to FIGS. 3a and 3b which shows line 18 in its fully deployed position, launcher 16 includes the principal components of a horn structure 50, and dielectric structures 52, 54 and 56, all of which are axisymmetric about the centerline of transmission line 18. Horn structure 50 has a constricted end 50a including a tubular section 50b of substantially uniform diameter for cooperating with an adjustable impedance matching coupling 60 that mechanically and electrically joins coaxial feed cable 44 to horn structure 50. From constricted end 50a, horn 50 flares outwardly, in accordance with an exponential divergence per unit axial length, terminating at a flared end 50c downstream of which the horn bounded electromagnetic noise signal energy is launched as a surface wave onto the conductor provided by line 18.

Adjustable coupling 60 is provided by a tubular member 62 dimensioned so as to slidably (telescopically) fit inside of tubular section 50b. A stop ring 64 slips over member 62 and can be locked at a fixed axial position on member 62 by screw 65, so as to abut against end 63 of the tubular section 50b of horn structure 50. The noninserted end of tubular member 62 is mechanically and electrically joined to the outer braided conductor of coaxial cable 44 by means such as soldering or brazing. In this manner, coupling 60 provides a slidable adjustment between member 62 and tubular section 50b over an adjustment distance $\Delta 1$ for impedance matching the coaxial feed cable 44 to the input end of horn 50.

Cable 44 is of a conventional coaxial type including a center conductor 44a, a braided outer conductor and protective sheath 44d which as mentioned above is soldered or brazed to the noninserted end of member 62, and a dielectric body 44b disposed between conductors 44a and 44d. To join cable 44 to member 62 the outer braided conductor 44d is stripped back a distance somewhat greater than the overall length of tubular member 62. Member 62 is now slid over the thusly exposed body of dielectric 44b so that the end of body 44b and the inner conductor 44a project beyond the inserted end of member 62. The braided conductor 44d is now soldered or brazed to the opposite end of conductor 62.

Adjacent the inserted end of member 62, dielectric of cable 44 is tapered down to inner conductor 44a as indicated at 44e and the terminal end of inner conductor 44a is electrically and mechanically joined as indicated at 66 to the smaller end of a tapered transition conductor 68 of increasing diameter in the direction toward the single wire transmission line 18. The larger end of transition conductor 68, which for example may be of solid brass or other conductive metal, is mated to and is mechanically and electrically joined to a matching diameter of a leading end of single wire transmission line 18.

Dielectric structure 52 serves to center transition conductor 68 and the adjoining leading end of single wire transmission line 18 at an axially intermediate position within horn structure 50 and is shaped and mated to horn structure 50 so as to minimize any impedance discontinuity occasioned by the presence of its dielectric body, which has a dielectric in excess of that of free space so as to have a material effect on the electromagnetic signal energy. For this purpose horn structure 50 is shaped as follows. Commencing at a location along the axis of launcher 16 that lies in transverse registration with the taper 44e on the body of dielectric 44b, and hence downstream of tunable coupling 60, horn structure 50 enlarges in diameter along its axis of symmetry and then with a decreasing amount of divergence until reaching the midsection of 52a of dielectric structure 52, where the interior diameter of horn 50 is approximately constant along the axis. The initial enlargement of horn structure 50 followed by a decreasing amount of divergence along the axis, coincides with the position of a leading taper 52b on dielectric structure 52 that commences at an end 52c disposed axially downstream of the junction 66 between transition conductor 68 and the inner conductor 44a of cable 44. The initial enlargement of horn structure 50 in registration with the leading taper 52b of structure 52 provides a smooth impedance transition in this region.

The midsection 52a of dielectric structure 52 is fixedly attached to the interior surface of horn structure 50 so that structure 52 is prevented from sliding axially forwardly or rearwardly as line 18 and transition conductor 68 are fed through a central bore 52e.

Continuing toward the flared end 50c of horn structure 50 from the midsection 52a of dielectric structure 52, the wall of horn structure 50 again commences to diverge outwardly here in an exponential fashion along the axis of the structure and such outward divergence is in registration with a trailing taper 52f on structure 52. Like the leading taper 52b, the trailing taper 52f of structure 52 provides a smooth, blended impedance transition for the axially propagating electromagnetic energy where the decreasing amount of dielectric material associated with taper 52f gradually releases the electromagnetic energy into the lower dielectric volume associated with the air space existing between horn structure 50, and structure 52. Taper 52f terminates at an end 52g at which the electromagnetic energy is contained totally within the air space dielectric.

End 52g of the trailing taper 52f of structure 52 terminates substantially upstream of end 50c of horn structure 50 as depicted in the composite of FIGS. 3a and 3b. Between dielectric structure 52 and end 50c of horn structure 50, the wall of the horn diverges outwardly in an exponential flare.

Adjacent end 50c of horn 50, a bulbous shaped dielectric guide structure 54 is disposed to serve as a support structure for maintaining an elongate, double tapered dielectric lens structure 56 coaxial with the centerline of horn structure 50. A rearward portion 54a of guide structure 54 has a circumferential surface mated to the interior flare of horn 50 and terminating at a transverse plane 54b. Projecting downstream of end 50c guide structure 54 has a generally semi-spherical, bulbous portion 54c defining an axis of symmetry that is coaxial with the centerline of horn structure 50 and line 18. Dielectric guide structure 54 is, unlike structure 52, selected to have a dielectric constant that is approximately that of free space so as to be inert with respect to the transmission of electromagnetic energy. This is achieved by using a material such as rigid, polyurethane foam. In particular, such a foam having a density of 2 lbs/ft$^3$ has been found suitable for use as dielectric structure 54.

Dielectric lens structure 56 is tapered at both axial ends and is secured in coaxial alignment with the centerline of horn structure 50 by a matingly tapered opening 54d provided in foamed dielectric structure 54. An axial bore 56a extends the entire length of lens 56 from an end 56b of the leading taper 56c, through a midsection 56d of maximum diameter and through a trailing taper 56e that terminates at a trailing end 56f. The leading taper 56c and the dielectric constant of lens structure 56 are selected so as to compensate for the otherwise abrupt impedance transition existing at the termination of flared end 50c of horn structure 50 by causing a portion of the electromagnetic energy emerging from the horn and to be concentrated in the body of lens structure 56. In so doing, the radially oriented E (electric) fields of the TEM electromagnetic waves are compressed relative to the radial extent of such fields in the absence of dielectric lens structure 56. Downstream of the maximum diameter midsection 56d of lens structure 56, the compressed E fields of the wave energy are allowed to expand gradually in the trailing taper 56e, to blend the emerging wave energy with the steady state surface wave propagation along line 18. Once launched onto line 18, the wave energy is in effect "glued" to the conductive surface of the single wire transmission line in accordance with the teachings of A. Sommerfeld and G. J. E. Goubau as disclosed in U.S. Pat. No. 2,685,068 issued to Goubau on Jul. 27, 1954. As described more fully below in connection with FIGS. 4 and 5, line 18 in the preferred embodiment has an outer conductive surface in which the propagating electromagnetic wave energy is compressed around the line by the presence of slight DC resistance in the surface conductor, rather than by using a sheathing of dielectric material around a core conductor as in the case of a Goubau transmission line. By using a coaxially cable feed into the constricted end of horn structure 50, a broadband coupling is achieved between coaxial cable 44 and the horn as compared to the use of a resonant cavity coupling which is inherently narrowband. Additionally, the exponential divergence of horn structure 50 downstream of the midpoint of guide structure 52, causes the launcher to be less frequency sensitive, enhancing its broadband performance, as does the leading taper 56c of dielectric lens structure 56. Further still, such exponential shaping of the horn together with the provision of lens structure 56 minimizes the diameter of structure 50 at wave launching end 50c even though line 18 is a Sommerfeld line which as discussed more fully hereinafter exhibits a relatively larger diameter energy bundle, compared to a Goubau transmission line hence suggesting the need for a substantially large diameter launcher than has been found needed in actual practice.

With reference to FIGS. 4 and 5, line 18 is formed of an innermost solid nylon tension strand 18a surrounded by a braided multifiber cord 18b made of synthetic fiber strands which coact with the solid nylon strand 18a to provide tension strength for line 18 while also allowing it to remain flexible for coiling on stowage reel 46. Surrounding cord 18b is a homogeneous body 18c of foamed synthetic material such as polypropylene to provide a relatively large diameter circumference onto which a thin conductive sheath 18d is provided by wrapping a web of aluminum foil around body 18c and finishing the wrap with a lengthwise seam 18e. After the conductive foil 18d is applied to the dielectric body 18c, it is embossed with a herringbone pattern of alternating ridges and furrows as indicated at 18f such as by initially applying a braided, conductive sheath about line 18 and then removing the braiding to leave the herringbone embossed surface 18f on the exterior of line 18 as best shown by FIG. 4. In this particular embodiment, the manufacturing steps used in forming line 18 are substantially the same as those used to make a durable, coaxial cable used in closed circuit television transmission except that the outer braided sheath is first applied and then removed in the present embodiment to form the herringbone embossed surface 18f, whereas in case of the coaxial cable the sheath is permanently retained. Also, in the case of the coaxial cable transmission line, the innermost core of the line is a solid copper conductor, rather than the non-conductive nylon strand 18a and braided fiber cord 18b shown in FIG. 5.

Since the transmission mode of line 18 is a surface wave rather than a bounded wave inside a coaxial cable, the innermost conductor is omitted in line 18 to reduce the weight of the towed line and to increase its flexibility for coiling on storage reel 46. The embossed surface 18f of conductive foil 18d allows the foil to be compressed and stretched so as to avoid an unwanted tendency of a smooth, unwrinkled conductive foil to shingle and buckle when line 18 twists in flight and when it is coiled even on a relatively large diameter drum of a storage reel. Unlike the uniformity of the embossed surface 18f, random shingling of a conductive foil on the line will severely disrupt the surface wave transmission characteristics of the electromagnetic energy and cause some of the energy to be leaked transversely from the line before reaching drogue radiator 20. By way of example, a line 18 formed in the manner described is capable of being stowed on a one foot diameter drum without causing any permanent deformation of the conductive foil 18d that would interfere with the transmission of the electromagnetic energy as a surface wave in accordance with the Sommerfeld principle.

The trailing end of line 18 is mechanically and electrically joined as indicated at 70 in FIG. 3b to the apex of a rearwardly divergent conical drogue 20 which is hollow and open to the rear. Air flow perforations 72 are provided in the wall of conical drogue radiator 20 for stabilizing the flight of the drogue and to balance the lift-to-drag ratio of drogue radiator 20 to that of line 18. It is noted that the flight characteristics of line 18 are substantially dictated by those physical characteristics of line 18 which allow it to function as a transmission line. By aerodynamically configuring drogue radiator 20 to provide a lift-to-drag ratio that approximates that of line 18 itself, the flight of line 18 and drogue radiator 20 attached thereto tends to be stable, without significant bending that would interfere with the transmission characteristics of line 18 as a single wire line transmission system. Also, drogue radiator 20 helps dampen any tendency of air turbulence to induce traveling or galloping waves in the line 18 which also can significantly interfere with its electrical transmission properties.

Based on the above-disclosed principles of launcher 16, line 18 and drogue radiator 20, a single wire transmission line subsystem 14 has been constructed and tested over a relatively broadband frequency range of 6 to 18 gigahertz. Moreover, it has been demonstrated that the lower limit of the bandwidth is actually about 2 gigahertz, and thus the overall bandwidth is several octaves.

At these frequencies, the following specifications and dimensions for the coaxial feed cable 44, launcher 16, line 18 and drogue radiator 20 were used. Coaxial cable 44 is a conventional 50 ohm coaxial cable while the single wire transmission line 18 has an air space impedance of approximately 400 to 600 ohms. Thus, launcher 16 must provide a low loss broadband coupling between the relatively low impedance of the coaxial feed cable 44 and the substantially higher impedance of single wire transmission line 18. In this particular embodiment, given the required impedance transition, bandwidth and frequency range, the tubular section 50b of horn structure 50 is approximately two inches in length, while the insertable tubular member 62 connected to the shield of cable 44 is one and three-quarters inches long for a tuning distance of $\Delta 1$ between locations A and B (indicated in FIG. 3a) of slightly over one-half of an inch. At location B corresponding to the constricted end of horn structure 50, the inside diameter of the horn wall is approximate 0.25 inches. The distance between locations B and C is approximately 3.0 inches and the inside horn diameter at location C is about 0.625 inch. Transition conductor 68 is made of brass and is approximately 1.35 inches long and joins the outer conductive foil of line 18 at a junction that is disposed intermediate the ends 52c and 52g of dielectric 52 when the line is fully deployed as depicted in FIGS. 3a and 3b. Between locations C and D, horn structure 50 flares outwardly in the above-described exponential fashion from the inside diameter of 0.25 inches at location B to a maximum inside diameter of 4 inches at location D corresponding to end 50c of the horn. More generally, horn structure 50 diverges exponentially from an inside diameter of approximately one quarter of an inch at location B to a maximum diameter of from 2-5 $\lambda_0$ (wave lengths) over a length of from 4-8 $\lambda_0$ (wave lengths), where $\lambda_0$ is the mean wave length of the broadband noise signal.

Dielectric guide structure 52 is in this embodiment made from a synthetic material such as polytetrafluoroethylene having a dielectric constant of approximately 2.1, and has an overall length between the leading and trailing ends 52c and 52g of 3.5 inches and a maximum diameter of 0.625 inch. Each end of structure 52 is tapered down to approximately the diameter of the through bore which is 0.25 inch, or somewhat larger than the diameter of line 18 to permit the line and the larger end of transition conductor 68 to slide through the launcher assembly during deployment and retraction.

The size and configuration of guide structure 54 is not critical and need merely be dimensioned and mounted so as to securely center, with respect to the end 50c of the horn. As mentioned, structure 54 has a dielectric constant approximately that of air so as to not alter the propagation of the electromagnetic wave energy other than that which would occur because of the presence of the air dielectric. On the other hand, dielectric lens structure 56 is made of a dielectric material such as polytetrafluoroethylene having a dielectric constant of approximately 2.1 to achieve the above-mentioned gradual compression of the electromagnetic energy as it emerges from the end 50c of horn structure 50 followed by a gradual expansion of the bundle of energy as it becomes launched as a steady state surface wave onto single wire transmission line 18. For this purpose, the maximum diameter of dielectric lens structure 56 at location E is approximately 0.4 inch and its overall length between the leading and trailing ends 56b and 56f is approximately 16 inches. The midsection 56d where the diameter of dielectric lens structure 56 is at a maximum is disposed at approximately 0.5 inch beyond the end 50c of horn structure 50.

Single wire transmission line 18 having the above-described configuration is selected in this embodiment to have an overall outer diameter of 0.2 inch measured with respect to the outer surface of foil 18d. The thickness of foil 8d is approximately 0.001 inches. A line 18 constructed thusly has a weight of approximately one pound per 100 feet. The length of line 18 between transition conductor 68 and drogue radiator 20 may vary within the broad constraint of disposing drogue 20 sufficiently behind the aircraft to place the aircraft outside the destructive radius of anti-aircraft weaponry. By way of example, line 18 may be from 100 to 1,000 feet in length. At the greater length of 1,000 feet, the loss in power is less than 8 db at 10 gigahertz.

It has been found that a line 18 constructed as a Sommerfeld transmission line and hence without a Goubau dielectric coating on the outer conductive surface, has sufficient resistance in the aluminum foil 18d as used in the preferred embodiment, to retard the propagation of that portion of the field lying close to the surface of the line. That phenomenon, in accordance with the principles of the Sommerfeld line, compresses or holds the bundle of electromagnetic energy to the line and hence guides the energy without allowing it to radiate radially outwardly from the line. While such a Sommerfeld line 18 exhibits a larger radial field than the surface coated Goubau line, nevertheless line 18 when used in combination with the wave launcher 16 provides an efficient transmission device together with low leakage and a low weight per unit length, both such properties being desirable in this environment.

In this same embodiment, drogue radiator 20 is made of a conductive sheet metal formed to the shape of a cone having a 45° slant. The smaller end of the cone is truncated and mated to the diameter of line 18, while the larger and trailing end of the cone has a diameter of at least four inches. More specifically, the maximum cone diameter is selected to intercept the bundle of electromagnetic energy that is traveling in an imaginary tube along line 18. A four inch diameter cone is estimated to intercept approximately 96 percent of the wave energy at 9.5 gigahertz. The amount of energy intercepted and hence radiated by the drogue can be enhanced further by using a delaunching dielectric lens at the leading axial end of the conical drogue as described more fully hereinafter in connection with an alternative embodiment of the drogue radiator shown in FIGS. 6 and 7.

Operation

During takeoff and nonstealth flight, the ventriloqual-like jamming system shown in FIGS. 1 and 2 is disposed in a retracted or stowed configuration by coiling line 18 onto the stowage reel 46, thereby drawing drogue radiator 20 up against the dielectric lens 56 of launcher 16. When radar deception is desired, stowage reel 46 is operated to feed out line 18 through the launcher 16 during which time drogue radiator 20 acts as a drag at the trailing end of line 18 to apply tension to the line and assist in pulling the line out into a trolling configuration behind the aircraft. The deployment of single wire transmission line 18 and drogue radiator 20 continues in this manner until the transition conductor 68 between line 18 and the center conductor 44a of cable 44 (see FIG. 3a) approaches the constricted end 50b of horn structure 50. At this time, tubular slide member 62, which is connected to shield 44b of cable 44, slides into the tubular section 50b of horn structure 50. The impedance matching adjustment Δ1 has been previously set by adjusting slidable ring 64 to a position that has been predetermined to provide the optimum impedance match between cable 44 and the impedance at the constricted end of horn structure 50. And hence, screw 65 has been tightened to secure ring 64 to member 62 so that member 62 is at a fixed axial position with respect to tubular section 50b when the single wire transmission line 18 is fully deployed.

Noise generator 30 and the various amplification stages associated therewith are powered up to transmit the relatively broadband noise signal out over coaxial feed cable 44 to the single wire transmission line subsystem 14. For radar jamming, a relatively broadband noise signal is used that lies within the frequency range of the anticipated tracking radar and at a radiated power level that is approximately 10 db or greater than the skin reflected radar return signal that is to be masked. For example, a frequency range of from 6 to 18 gigahertz has been transmitted by the embodiment of the invention disclosed herein at a radiated power of about 10-20 watts. This microwave signal is efficiently launched by launcher 16 onto single wire transmission line 18 where the energy is propagated along the line in a surface wave mode with only minimal and tolerable leakage from launcher 16 and line 18. This minimal leakage is at a power level that is so much lower than the energy radiated by drogue radiator 20, that the jamming signal from the drogue predominates so as to cause tracking radar 11 to home-in only on radiator 20. In the preferred embodiment constructed as disclosed above, the leakage from the launcher 16 and intermediate sections of line 18 is at least 20 db below the power level radiated by drogue radiator 20.

When single wire transmission line subsystem 14 is deployed in flight, drogue radiator 20 and line 18 by virtue of matching their lift to drag ratios, cause line 18 to fly in a substantially straight path, with only slight curvature during certain maneuvers and wind conditions. Such minimal curvature has been found to not significantly degrade the characteristically high transmission efficiency of single wire line 18. Moreover, in most anticipated flight conditions, the line 18 is not interfered with by such earthbound environmental conditions as snow, rain, ice or birds which have tended to detract from the practical applications of such a transmission system when the line is strung on telephone poles or the like.

The noise energy that appears to originate from drogue radiator 20 serves to obscure the presence of the radar signal reflected off the skin or target aircraft 12, that radar 11 either loses all tracking information, or if equipped with home on noise, starts tracking the apparent source of the noise which is drogue radiator 20. In either case, precise angle information of the aircraft's position is denied.

Even with the masking effect of the ventriloqual-like jamming signal radiated from a substantial distance behind the target aircraft by drogue radiator 20, some sophisticated versions of tracking radar 11 may be equipped with circuitry which by using signal integration techniques, can enhance the resolution of the obscured skin reflected radar return signal in the presence of the jamming noise. The signal energy associated with each reflected radar signal, will be in effect superimposed on the background noise energy attributed to the ventriloqual-like jamming signal and, thus, appear as a "bump" on an otherwise constant level of noise energy.

These energy "bumps" can in some cases be resolved by integrating the received radar signal to improve the capability of the tracking radar 11 to home-in on the skin reflected radar signal. To defeat this integration enhancement, anti-integration network 90 is combined with the basic ventriloqual noise jamming system of FIG. 2 and operates concurrently with the ventriloqual-like jamming signal that is radiated by drogue radiator 20. For this purpose, the transmitting channel 90a of network 90 transmits via antenna 92 mounted on the aircraft's body, a substantially continuous background noise signal that has a substantially lower power level than the primary jamming signal that is transmitted out over single wire line 18 and radiated by drogue radiator 20. The noise signal from channel 90a is controlled to provide time domain "holes" or gaps in the otherwise continuous noise energy, with such "holes" being located in time so as to hide the return radar signal reflected off the skin of target aircraft 12.

Thus, with reference to FIG. 9, noise signal waveform 120, shown on a much enlarged scale, is composed of a substantially continuous noise component 120a, separated by a time domain "hole" 120b. As discussed above, the timing and width of hole 120b is located by the radar pulse signal received at antenna 94 (FIG. 8) so as to locate this signal energy void at a position in the time domain that coincides with the reflection of the radar signal off the aircraft skin. This is represented in FIG. 9 by the reflected radar pulse 126. It is appreciated that the composite waveform shown in FIG. 9 is that of the noise radiated from the aircraft mounted transmit antenna 92 and does not show the ventriloqual noise radiated from drogue radiator 20 (FIG. 8). Moreover, as shown in FIG. 9, the power level of the noise waveform 120a is adjusted by means such as variable attenuator 98 (FIG. 8) so as to approximately match the anticipated strength (power level) of the reflected radar pulse 126 so that the noise energy emanating from the aircraft appears to be of a relatively uniform signal strength and there is neither an energy void nor an energy "bump" at the location of time domain "hole" 120b and the reflected radar pulse 126.

While it might be thought that the time domain "hole" 120b would unavoidably occur behind (after) the reflected radar pulse, the response time of anti-integration network 90 has been found adequate to respond to the receipt of the radar transmit (waveform 122) signal in the receiving channel 90b and create the time domain "hole" 120b in noise waveform 120 so that the "hole" is transmitted back toward the tracking radar with the reflected radar pulse 126 (FIG. 9) and without significant loss of coincidence therebetween.

Now with reference to FIG. 10, a composite of the ventriloqual noise from radiator 20 is shown as waveform 128 superimposed on the composite noise signal waveform shown in FIG. 9. It is observed that the total signal energy content of the composite of waveforms 120a, 126 and 128 is fairly uniform with time. Furthermore, the strength of the ventriloqual noise waveform 128 is substantially greater than the background noise signal represented by waveform 120a and reflected radar pulse 126, so that the predominant source of noise energy emanating from the vicinity of aircraft 12 (FIG. 1) is from drogue radiator 20 in order to deceive the tracking radar as to the angular position of target aircraft 12 (FIG. 1). Preferably, the ventriloqual signal from drogue radiator 20 is of a power level that exceeds the relatively lower level noise from transmit antenna 92 of the anti-integration network 90 (FIG. 8) by a factor of at least 10 dB. This preferred ratio of signal energy causes a noise centroid (apparent source) that is located at approximately 90 percent of the distance along transmission line 18 (away from aircraft 12) toward drogue radiator 20.

The ventriloqual jamming signal radiated from drogue 20 as shown in FIG. 1 does not require detailed or particular preknowledge of the tracking radar 11 which may be encountered. The noise energy generated and transmitted by the system masks such information as the range of the towing aircraft 12 from radar 11 and denies angle information that might otherwise be obtained by tracking systems that home-in on a noise source. The ventrilogual jamming signal is thus effective against many radar types and is relatively uncomplex in design and hence is reliable in operation and easy to maintain. Moreover, it is effective against such sophisticated tracking radars as the monopulse type, which is one of the most accurate tracking radar systems in terms of producing angle information.

With reference to FIGS. 6 and 7, an alternative drogue configuration is depicted in which a drogue radiator 20' is formed by a conically shaped conductive body 80 having on its outer and forwardly oriented face, radially outwardly spiraled fluting 82 shaped to effect polarization of the radiated E-fields. Fluting 82 is formed by a plurality of radially outwardly spiraling ridges of metal and/or dielectric material wherein the particular height and degree of spiraling determines the specific type of polarization that is achieved, e.g., circular polarization, slant linear polarization or circumferential polarization. By creating such complex polarization in the reflected electromagnetic wave energy, the jamming signal energy radiated by drogue 20' is far less susceptible to being tuned out by tracking systems having the capability of receiving radar return signals of only certain and selected polarization. In other words, it is difficult to tune out such complex polarization as circular, slant linear and circumferential.

Additionally, in this embodiment of the drogue radiator 20', the maximum diameter of the conical reflector body 80 is minimized by incorporating a wave delaunching axisymmetric dielectric lens structure 86 adjacent the junction between the trailing end of single wire transmission line 18' and the apex of the drogue's conical body 80. More particularly, lens structure 86 is made of a material having a dielectric constant substantially greater than that of air and has an axisymmetric shape that forms a tapered tubular body surrounding the foil conductor of line 18'. The taper of lens structure 86 is such as to increase in diameter in a direction toward radiator 20' commencing at a leading end 86a where the radial thickness of structure 86 is at a minimum and increasing in thickness to the terminal end 86b where both the end of line 18' and the trailing end of lens structure 86 are joined to the apex of conical shaped drogue body 80. The length of lens structure 86 is approximately 16 inches or 12 $\lambda_0$ (wave lengths) and in this embodiment corresponds to the length of the trailing taper 56e of dielectric lens structure 56 of launcher 16 (FIG. 3b).

Hence delaunching lens structure 86 functions in a manner similar to and as the counterpart of the trailing taper 56e of lens structure 56 that projects from the horn of launcher 16 by gradually compressing the cylindrical bundle of electromagnetic energy traveling rearwardly on transmission line 18' into a successively smaller and smaller diameter. By so doing, the maximum diameter of conical body 80 of drogue radiator 20' is minimized while still being large enough in the transverse plane to intercept the major portion of the total transmitted noise energy. While dielectric lens structure 86 is shown in connection with the modified drogue radiator 20' in FIGS. 6 and 7, it will be appreciated that a corresponding delaunching lens structure may be incorporated with the above-described drogue radiator 20 and the associated single wire transmission line 18 of FIG. 3b. Similarly, the conical body 80 of drogue radiator 20' may be modified by the provision of flight stabilizing air flow apertures 72 as provided on drogue radiator 20 (FIG. 3*b*).

While only particular embodiments have been disclosed herein, it will be readily apparent to persons skilled in the art that numerous changes and modifications can be made thereto including the use of equivalent means, devices, and method steps without departing from the spirit of the invention.

The embodiments of the invention in which an exclusive property or privilege is claimed are defined as follows:

1. A method of radar jamming comprising the combination of steps of:
   transmitting a first signal of suitable frequency content and power level for radar jamming from a signal radiator adjacent the trailing end of an elongate transmission line towed by an aircraft in which said first signal is a noise signal transmitted at a predetermined power level;
   concurrently transmitting a second signal of noise content from a transmitting location proximate the aircraft;
   receiving a transmitted radar signal at such aircraft;
   selectively modifying the transmission of said second signal so as to reduce its output level at times determined by the receipt of a transmitted radar signal so that the composite signal energy of the second signal and a reflection by the body of such aircraft of a transmitted radar signal is substantially uniform during the time of the reflected radar signal and such composite signal energy is superimposed by said first signal radiated from said radiator towed by the aircraft; and
   wherein said predetermined power level of said first signal is selected to be substantially greater than an unreduced normal output level of said second signal so that the combined first and second signals have an apparent point of origin at a position along said transmission line that lies closer to said signal radiator than to the body of the aircraft.

2. The method of claim 1, wherein said step of transmitting said first signal comprises setting said power level of said first signal greater by a factor of 10 db or more than a predetermined power level of said second signal during its unreduced normal output level.

3. A radar jamming system adapted to be carried by an aircraft seeking to avoid position locating radar comprising the combination of:
   first transmitting means including an elongate transmission line adapted to be towed by such an aircraft for radiating a first signal from a radiating position located at a predetermined distance from such aircraft and having a predetermined power level and frequency content so as to be suitable for radar jamming;
   second transmitting means adapted to be carried by such an aircraft for radiating a second signal from a position proximate such aircraft and having noise content, said second transmitting means including controllable means for changing a power level of said second signal between a predetermined normal level and a predetermined reduced level;
   radar signal receiving means adapted to be carried by such an aircraft for receiving thereat a transmitted radar signal;
   control circuit means coupled to said controllable means of said second transmitting means and to said radar signal receiving means for controlling said second transmitting means so as to selectively change said second signal by reducing its power level from said normal level to said reduced level at times determined by the receipt of a transmitted radar signal; and
   said first transmitting means having means for setting said predetermined power level of said first signal substantially higher than said predetermined normal power level of said second signal of said second transmitting means.

4. A radar jamming system adapted to be carried by an aircraft seeking to avoid position locating radar comprising the combination of:
   first transmitting means including an elongate transmission line adapted to be towed by such an aircraft for radiating a first signal from a radiating position located at a predetermined distance from such aircraft and having a predetermined power level and frequency content so as to be suitable for radar jamming;
   second transmitting means adapted to be carried by such an aircraft for radiating a second signal from a position proximate such aircraft and having noise content, said second transmitting means including controllable means for changing a power level of said second signal between a predetermined normal level and a predetermined reduced level;
   radar signal receiving means adapted to be carried by such an aircraft for receiving thereat a transmitted radar signal;
   control circuit means coupled to said controllable means of said second transmitting means and to said radar signal receiving means for controlling said second transmitting means in response to the receipt of a transmitted radar signal so as to produce a time domain gap of said reduced power level in said second signal positioned in time to coincide with each reflection off the aircraft of a transmitted radar pulse signal received by said radar signal receiving means; and
   said first transmitting means having means for setting said predetermined power level of said first signal substantially greater than said normal power level of said second signal of said second transmitting means so that an apparent point of origin of the combined first and second noise signals is closer to said radiating position of said first signal than to the aircraft.

5. A radar jamming system adapted to be carried by an aircraft seeking to avoid position locating radar comprising the combination of:
   first transmitting means including an elongate transmission line adapted to be towed by such an aircraft and a noise signal generating means for radiating a first noise signal from a radiating position located at a predetermined distance from such aircraft and having a predetermined power level and frequency content so as to be suitable for radar jamming;
   second transmitting means adapted to be carried by such an aircraft and being connected to said noise signal generating means for radiating a second signal from a position proximate such aircraft and having noise content, said second transmitting means including controllable means for changing a power level of said second signal between a predetermined normal level and a predetermined reduced level;
   radar signal receiving means adapted to be carried by such an aircraft for receiving thereat a transmitted radar signal;
   control circuit means coupled to said controllable means of said second transmitting means and to said radar signal receiving means for controlling said second transmitting means so as to selectively change said second signal by reducing its power level from said normal level to said reduced level at times determined by the receipt of a transmitted radar signal.

\* \* \* \* \*